US011769282B2

(12) United States Patent
Rascon et al.

(10) Patent No.: US 11,769,282 B2
(45) Date of Patent: Sep. 26, 2023

(54) SYSTEM AND METHOD FOR GENERATING AND RENDERING A SELF-CONTAINED REPORT DATA STRUCTURE

(71) Applicant: Digits Financial, Inc., San Francisco, CA (US)

(72) Inventors: Manuel Deschamps Rascon, Green Cove Springs, FL (US); Mark Eli Moreau Roseboom, Oakland, CA (US); Jonathan Le, Sunnyvale, CA (US); Michael Furtak, Malden, MA (US); Jeffrey Hall Seibert, Jr., San Mateo, CA (US); Wayne Chang, North Andover, MA (US)

(73) Assignee: Digits Financial, Inc., San Francisco, CA (US)

( * ) Notice: Subject to any disclaimer, the term of this patent is extended or adjusted under 35 U.S.C. 154(b) by 260 days.

(21) Appl. No.: 17/070,248

(22) Filed: Oct. 14, 2020

(65) Prior Publication Data

US 2022/0114774 A1    Apr. 14, 2022

(51) Int. Cl.
*G06T 11/20* (2006.01)
*G06F 16/248* (2019.01)
*G06F 40/18* (2020.01)

(52) U.S. Cl.
CPC .......... *G06T 11/206* (2013.01); *G06F 16/248* (2019.01); *G06F 40/18* (2020.01)

(58) Field of Classification Search
None
See application file for complete search history.

(56) References Cited

U.S. PATENT DOCUMENTS

| | | | |
|---|---|---|---|
| 5,461,708 A | 10/1995 | Kahn | |
| 7,170,519 B2 | 1/2007 | Patel et al. | |
| 7,673,340 B1 * | 3/2010 | Cohen | G06F 11/3438 |
| | | | 379/266.08 |
| 7,904,543 B2 | 3/2011 | Lindley | |
| 8,234,313 B2 * | 7/2012 | Bonatti | G06Q 10/10 |
| | | | 707/803 |
| 8,314,798 B2 | 11/2012 | Neelakantan et al. | |
| 9,244,894 B1 * | 1/2016 | Dale | G06F 40/134 |
| 9,251,222 B2 * | 2/2016 | Chang | G06F 16/20 |
| 10,210,530 B1 * | 2/2019 | Peters | G06Q 10/06 |
| 10,565,298 B1 * | 2/2020 | Bisignani | G06F 3/0482 |
| 10,776,355 B1 | 9/2020 | Batsakis et al. | |
| 10,896,209 B1 * | 1/2021 | Concannon | G06F 16/258 |
| 11,138,271 B1 * | 10/2021 | Morningstar | G06F 16/26 |

(Continued)

OTHER PUBLICATIONS

"Notification of Transmittal of the International Search Report and the Written Opinion of the International Searching Authority, or the Declaration," International Filing Date: Sep. 2, 2021, International Application No. PCT/US2021/048942, Applicant: Digits Financial, Inc., dated Dec. 7, 2021, pp. 1-14.

*Primary Examiner* — Howard Cortes
(74) *Attorney, Agent, or Firm* — Cesari and McKenna, LLP

(57) ABSTRACT

A system and method for automatically generating and rendering a report data structure is provided. The report data structure is formed in a platform independent manner that includes all data for transactions used in the report. The system analyzes the transactions to be included in the report and selects the type of display component based on a ranking score to best highlight the data contained therein.

26 Claims, 12 Drawing Sheets

(56) References Cited

U.S. PATENT DOCUMENTS

| | | | |
|---|---|---|---|
| 2005/0039033 A1* | 2/2005 | Meyers | G06F 16/284 |
| | | | 713/193 |
| 2007/0244848 A1* | 10/2007 | Chu | G06Q 10/06 |
| 2008/0046869 A1* | 2/2008 | Lambert | G06F 9/4493 |
| | | | 717/136 |
| 2008/0183735 A1* | 7/2008 | Bruckner | G06F 16/289 |
| 2008/0198156 A1 | 8/2008 | Jou et al. | |
| 2009/0327328 A1* | 12/2009 | Woodall | G06F 40/143 |
| | | | 707/999.102 |
| 2011/0040802 A1* | 2/2011 | Bonatti | G06Q 10/10 |
| | | | 707/E17.014 |
| 2013/0275866 A1* | 10/2013 | Miller-Cushon | G06F 16/2372 |
| | | | 715/273 |
| 2015/0067520 A1 | 3/2015 | Kovacs et al. | |
| 2015/0142727 A1* | 5/2015 | Louie | G06F 16/248 |
| | | | 707/603 |
| 2015/0170382 A1* | 6/2015 | Bhatia | G06Q 40/00 |
| | | | 345/440 |
| 2017/0076471 A1* | 3/2017 | Prophete | G06F 40/137 |
| 2017/0168664 A1* | 6/2017 | Kashyap | G06T 11/206 |
| 2018/0300543 A1* | 10/2018 | Kawasaki | G06Q 10/101 |
| 2018/0336253 A1* | 11/2018 | Sekharan | G06F 3/14 |
| 2019/0108081 A1* | 4/2019 | Krishnan | G06F 11/3409 |

* cited by examiner

Sample, Inc — 610                           620 — September 2-8, 2019

| Transactions This Week — 645F | 22 TRANSACTIONS | 20 VENDORS | $47,701.89 TOTAL SPEED |
|---|---|---|---|
| DATE | TRANSACTION | | AMOUNT |
| SEP 08 | Company H — Recruiting | MONTHLY SINCE DEC 2017 | $59 |
| SEP 07 | Company I — Office Expenses | | $5.00 |
| SEP 07 | Company J | MONTHLY SINCE FEB 2019 | $17.15 |
| SEP 06 | Company K — Software & Web Services | MONTHLY SINCE SEP 2018 | $100.00 |
| SEP 05 | Company L — Office Expenses | | $65.43 |
| SEP 05 | Company M — Meals | | $168.65 |
| SEP 05 | Company N — Ground Transportation & Parking | | $10.11 |
| SEP 04 | Company A — Hosting | MONTHLY SINCE JAN 2019 | $45,004.92 |
| SEP 04 | Company O — Office Expenses | | $24.95 |
| SEP 04 | Company P — Software & Web Services | MONTHLY SINCE MAR 2018 | $138.00 |
| SEP 04 | Company Q — Software & Web Services | YEARLY SINCE 2018 | $216.00 |
| SEP 04 | Company R — Payroll & Benefits Administration | | $251.00 |
| SEP 04 | Company S — Office Expenses | | $102.80 |
| SEP 04 | Company T — Software & Web Services | MONTHLY SINCE OCT 2018 | $40.63 |
| SEP 04 | Company D — Finance & Accounting | MONTHLY SINCE SEP 2019 | $258.06 |
| SEP 03 | Company U — Finance & Accounting | MONTHLY SINCE JUN 2019 | $180.00 |
| SEP 02 | Company B — Meals | MONTHLY SINCE SEP 2019 | $357.48 |
| SEP 02 | Company V — Hosting | | $3231.07 |
| SEP 02 | Company Y — Utilities | MONTHLY SINCE AUG 2019 | $89.33.48 |
| SEP 02 | Company W — Office Expenses | | $44.82 |

CONFIDENTIAL DIGITS REPORT   04

FIG. 6D

SYSTEM AND METHOD FOR GENERATING AND RENDERING A SELF-CONTAINED REPORT DATA STRUCTURE

BACKGROUND

Technical Field

The present invention is directed towards reports and, more particularly towards automatically generating and rendering a report.

Background Information

Numerous systems generate reports for review including, for example, financial and accounting systems, engineering systems, monitoring and control systems, etc. The report may be selected from a predefined template set by the system or a user may manually select one or more items to be included in the report. The system generates the report and typically displays the report and/or outputs the report in a document that may be printed or otherwise distributed.

In certain systems, the report document may be editable and may contain data that may be further manipulated. For example, a financial report may be generated as a spreadsheet that, depending on user permissions, may be further edited. In other systems, the report may be generated into a fixed format, such as the Portable Document Format (PDF) for printing or distribution. Other reports may comprise text documents, word processing system documents, etc.

One notable disadvantage of conventional report generation systems is that they are limited to predefined templates provided by the system provider. Certain systems may enable a user to provide some customization by determining what elements are to be included and in what order they are to be presented. When the user desires to generate a report for a given time, the system will gather the data and populate the report using the predefined template. A noted disadvantage of such statically formatted reports may arise when, for example, a significant change occurs in one or more entries, but the report type or format is not configured to highlight such changes. For example, if a metric has had a significant change, for better or worse, but the component of the report that includes that metric had not been selected by the user, not included in the system's template, and/or located in the report in a non-highlighted location, a reader of the report may miss the important data.

A further noted disadvantage is that the user selected components may not be applicable for certain data values. For example, assume that a user has selected to display monthly spending using a pie chart. If a refund occurs in a particular month, the spending in that category may be negative, reflecting the refund. A pie chart cannot appropriately display the fact that there is a negative value associated with one of the entries. This predefined report would be rendered useless by the actual data encountered. As will be appreciated by those skilled in the art, other types of mismatches may occur between the desire to represent data in a meaningful way and the actual data values.

A further noted disadvantage is that the report document typically does not contain all the transactions that were utilized to generate the report. Instead, the report document includes summations of the transactions. Therefore, even an interactive report may be limited to the extent of data that may be displayed.

SUMMARY

The disadvantages of the prior art are overcome by providing a system and method for generation and rendering of reports stored within a self-contained data structure. Advantageously, the self-contained data structure includes all the data necessary to render the report across a plurality of differing platforms. Reports may be generated automatically based on predefined criteria, on a predefined schedule, or in response to user input. A type of report and time period are first selected. Then, a snapshot of the data set that is applicable to the type of report and time period is obtained. Illustratively, in a financial/accounting report, this data set may comprise a set of all transactions, or other entries, that are needed for the report.

Based on the type of report, one or more report sections are identified. Within each section, one or more components are determined based on the data set. As used herein, a component comprises a textual or graphical representation of information related to the data set. Examples of components include, bar charts, scatter plots, line graphs, etc. A report generator analyzes the data set to identify which components best display the data and selects that component to display the particular data. Once the components have been selected, they are ranked. Sections are then ranked using the rankings of the components contained therein.

The report is then generated using the ranked sections and is stored in an exemplary data structure along with the data set used. The report data structure is illustratively a hierarchical structure that may be rendered on differing platforms. When a report is to be rendered, a report renderer can read the report data structure, identify the sections and components to be rendered, and render them using the data contained within the report data structure. By storing the report in a platform independent data structure, a report renderer may display the report in a manner most suitable to the device on which it is running, e.g., desktop computer, tablet, smart phone, etc. Further, by storing the entries used to generate the components in the data structure, a report renderer may cause certain components to be interactive, e.g., display underlying transactions when an aggregate value is highlighted or selected.

BRIEF DESCRIPTION OF THE DRAWINGS

The above and further advantages of the present invention may be better understood in relation to the accompanying figures, in which like reference numerals indicate identical or substantially identical elements, of which:

FIG. 6D is an image of a fourth page of an exemplary report in accordance with an illustrative embodiment of a present invention;

DETAILED DESCRIPTION OF AN ILLUSTRATIVE EMBODIMENT

I. Network Environment and Systems

Figure 1:
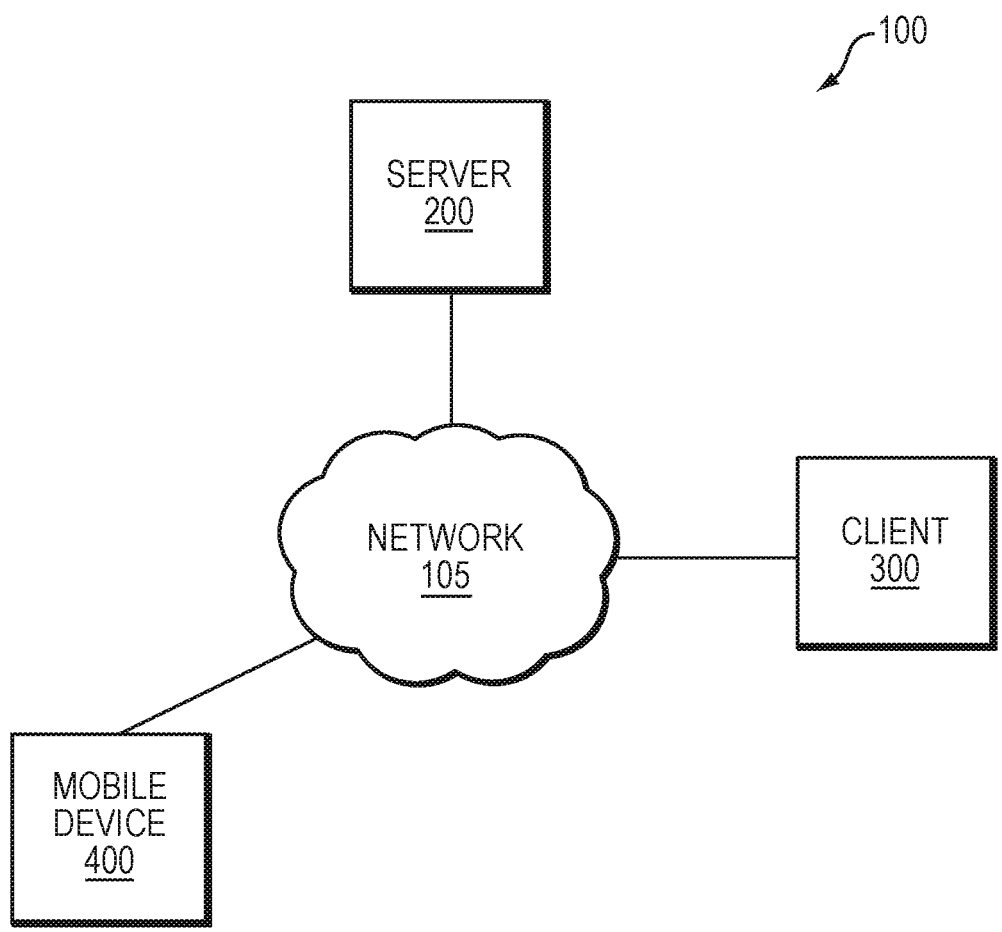
FIG. 1 is a schematic block diagram of an exemplary network environment in accordance with an illustrative embodiment of the present invention.

FIG. 1 is a schematic block diagram of an exemplary computer network environment 100 in accordance with an illustrative embodiment of the present invention. Specifically, the network environment 100 comprises of a network 105 that is operatively interconnected with one or more servers 200, clients 300, and/or mobile devices 400. It should be noted that network 105 is illustratively shown as a single network entity. However, it is expressly contemplated that network 105 may comprise of a plurality of interconnecting networks of the same and/or differing types, including, e.g., Wi-Fi networks, cellular telephone networks, local area networks (LANs), and/or wide area networks (WANs) including, for example, the well-known Internet. The various network connected entities typically communicate over the network 105 by exchanging discrete frames or packets of data according to predefined protocols, such as a Transmission Control Protocol/Internet Protocol (TCP/IP), Hypertext Transfer Protocol (HTTP), etc. Thus, for example, in an illustrative embodiment, a mobile device 400 may communicate using a cellular telephone network to transmit data. The exemplary cellular telephone network may then be interconnected with the Internet, which is further connected to a LAN, which ultimately is operatively connected to server 200.

Exemplary servers 200, described below in reference to FIG. 2, may execute an application that produces a report data structure that may be rendered on a client 300 or mobile device 400. Client computer 300, described further below in reference to FIG. 3, may comprise a user's computer that executes software designed to render the report data structure in accordance with an illustrative embodiment of the present invention. In alternative embodiments of the present invention, client computer 300 may communicate in a client-server relationship with server 200 to access an application executing on the server. In other alternative embodiments of the present invention, client computer 300 may execute a web browser that accesses server 200 to display information, including a report, relating to an application.

Figure 4:
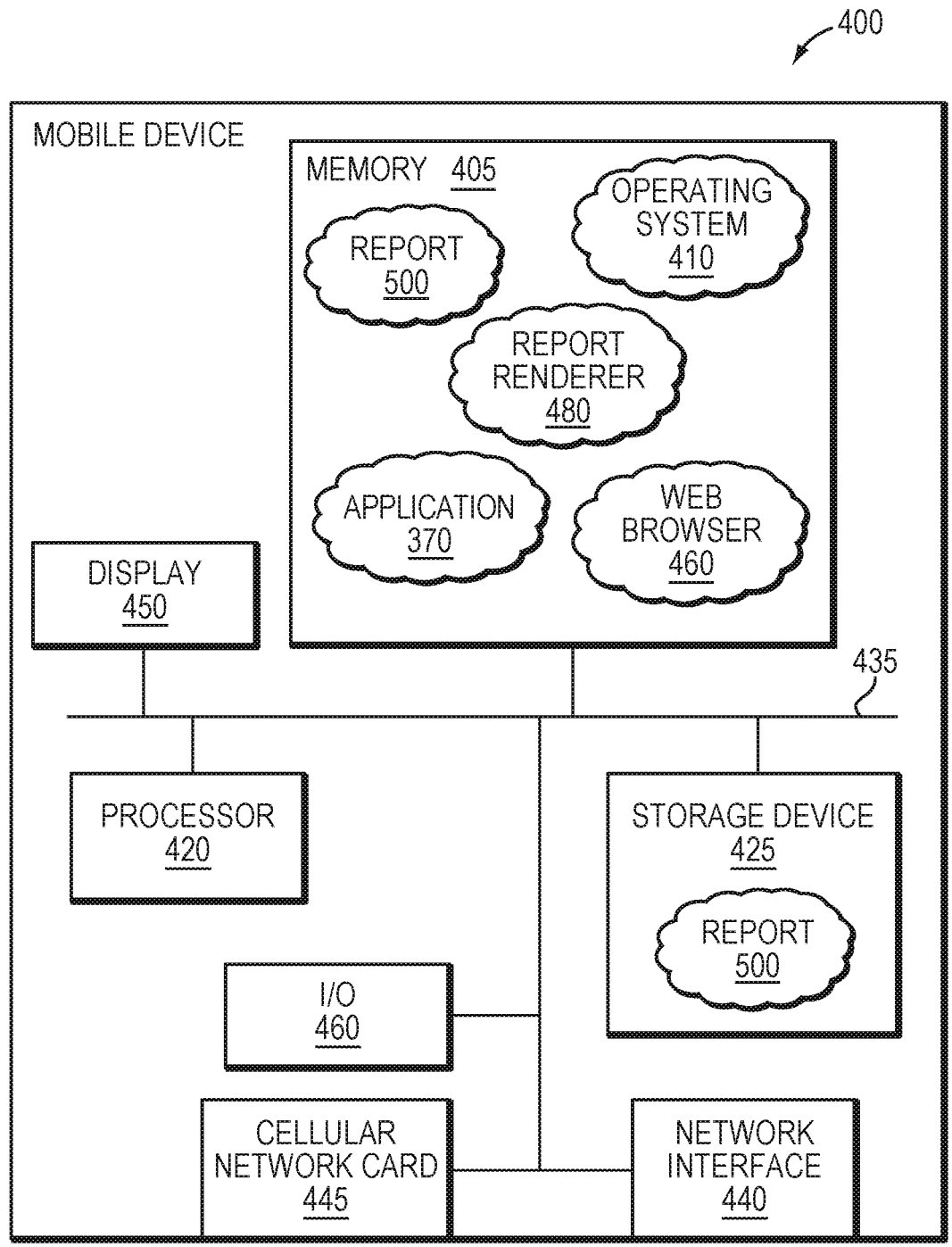
FIG. 4 is a schematic block diagram of an exemplary mobile device in accordance with an illustrative embodiment of the present invention.

Mobile device 400, described further below in reference to FIG. 4, is also illustratively operatively connected to network 105. Illustratively, mobile device 400 may comprise a smart phone, a personal digital assistant and/or a tablet computer. More generally, mobile device 400 may comprise any movable device capable of executing applications and/or accessing the worldwide web (WWW) via, e.g., a web browser.

Further, it should be noted that while a single server 200, client 300, and mobile device 400 are described and illustrated, in alternative embodiments of the present invention, a plurality of such network entities may be utilized. Therefore, the description and illustration of a single server 200, client 300, and/or mobile device 400 should be taken as exemplary only.

Figure 2:
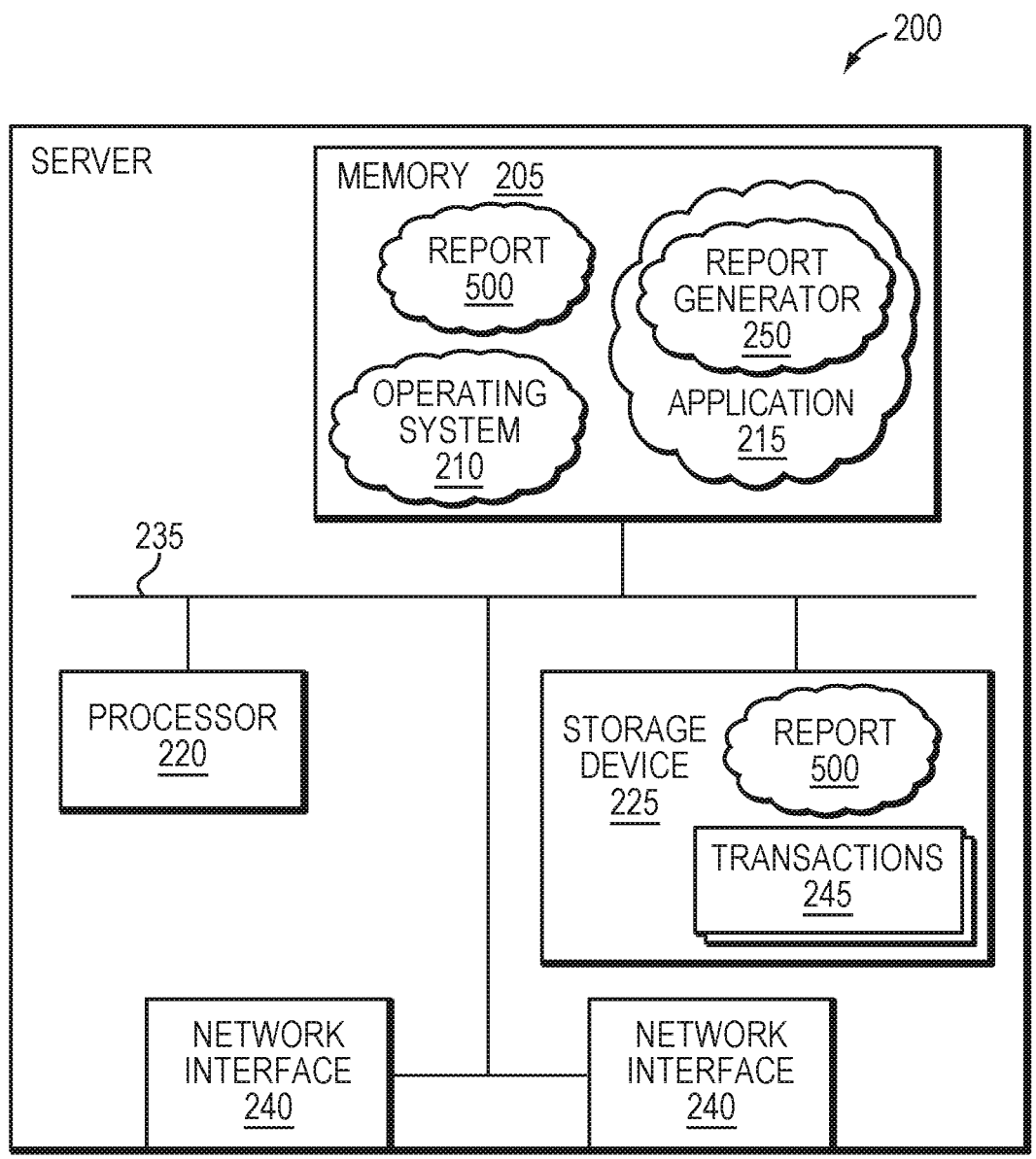
FIG. 2 is a schematic block diagram of an exemplary server system in accordance with an illustrative embodiment of the present invention.

FIG. 2 is a schematic block diagram of an exemplary server 200 in accordance with an illustrative embodiment of the present invention. The server 200 may illustratively comprise of one or more network interfaces 240, one or more processors 220, one or more storage devices 225, and a memory 205 operatively interconnected by a system bus 235.

The network interface 240 illustratively contains the mechanical, electrical, and signaling circuitry for communicating data over physical links coupled to a network. The network interface may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 240 may also be used to implement one or more virtual network interfaces, such as for Virtual Private Network (VPN) access, as is known to those skilled in the art.

The memory 205 comprises a plurality of locations that are addressable by the processor(s) 220 and the network interface 240 for storing software programs and data structures associated with the various embodiments described herein. The processor 220 may comprise necessary elements or logic adapted to execute software programs and manipulate data structures. An operating system 210, portions of which are typically resident in memory 205 and executed by the processor(s), functionally organizes the server 200 by, inter alia, invoking network operations in support of software processes and/or services executing on the server. An application 215, portions of which may be resident in memory 205, is executed by the processor to implement various functionality, such as an engineering monitoring system, a financial accounting system, etc. The descriptions and illustrations contained herein are directed towards an exemplary application 215 that implements a financial accounting system. However, it should be noted that it is expressly contemplated that the application 215 may implement other types of systems. Therefore, the description of a financial accounting system application 215 should be taken as exemplary only.

In accordance with an illustrative embodiment of the present invention, the application includes a report generator 250 module. It should be noted that in environment 200, report generator 250 is shown as being part of application 215, in alternative embodiments, the report generator 250 may be a separate program. More generally, the report generator 250 may be standalone software or its functionality may be incorporated into other software. Therefore, the description of report generator being part of application 215 should be taken as exemplary only.

In accordance with exemplary embodiments of the present invention, the report generator 250 is configured to generate reports, as described further below. These reports may be automatically generated in response to, e.g., a preconfigured schedule, a user instructing the system to generate a report, a value exceeding a predefined threshold, etc. One example would be that the application may be configured to generate a monthly spending report detailing the spend of the previous month on the first business day of the next month. Another example would be a user initiating a report generation as the user needs the report for a business purpose, e.g., a board of directors meeting.

In response, the report generator 250 analyzes the various transaction data entries 245 and generates a report data structure 500. The report data structure may be stored in memory 205 or on storage device 225. Further, the report data structure 500 may be transmitted over network interface 240 to computer 300 and/or mobile device 400.

It should be noted that in an illustrative embodiment of the present invention, the application 215 may be configured to operate in a client/server manner in which the application 215 executes on the server, but displays reports on a client 300 and/or mobile device 400. In alternative embodiments of the present invention, the application 215 may interact with a web server (not shown) executing on server 200 to provide reports accessible via a web browser that may be executed on, e.g., client 300 or mobile device 400.

The storage device 225, which may be internal or external to the server 200, stores data associated with the operating system 210 and application 215. In alternative embodiments, storage device 225 may comprise a plurality of devices, which may be internal and/or external to server 200. Storage device 225 may comprise a cloud-based storage, RAID array, etc. in accordance with alternative embodiments of the present invention. In accordance with an illustrative embodiment of the present invention, the storage device 225 stores transaction data 245 associated with the application 215. The present invention is written in terms of an application for accounting/finance. As such, the data associated with the application 215 comprises transaction data 245, e.g., records for each financial transaction. In alternative embodiments, the transaction data 245 may comprise the individual data entries that are utilized to generate the report data structure 500. For example, in a monitoring and control application 215, the transaction data 245 may represent readings taken from monitors at time intervals, e.g., the pressure measured at a gauge at time X, X+1, etc. Therefore, while the data is described as transaction data, it is expressly contemplated that the data 245 used to generate report data structure 500 may comprise other types of data. Further, the storage device 225 may store report data structure 500.

In alternative embodiments of the present invention, the various functionalities may be distributed among a plurality of servers. As such, the description of a single server 200 should be taken as exemplary only. Also, while the embodiments herein are described in terms of processes or services implemented as software executing on a processor, alternative embodiments may include the processes described herein being embodied as modules consisting of hardware, software, firmware, and/or combinations thereof. Therefore, the description of software applications should be taken as exemplary only.

Figure 3:
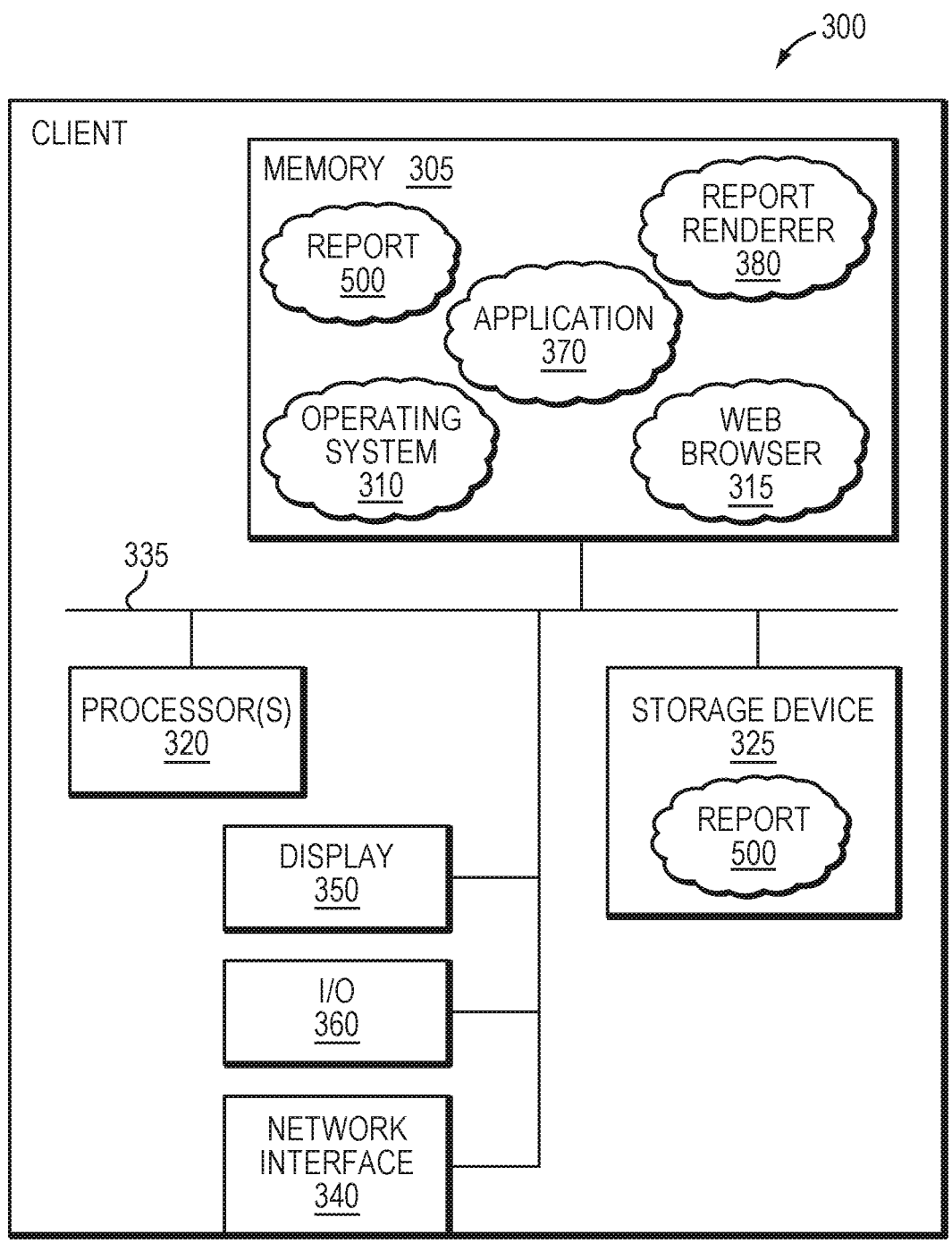
FIG. 3 is a schematic block diagram of an exemplary client computer system in accordance with an illustrative embodiment of the present invention.

FIG. 3 is a schematic block diagram of an exemplary client computer system 300 in accordance with an illustrative embodiment of the present invention. The client computer system 300, illustratively comprises a memory 305, one or more processors 320, one or more storage devices 325, a network interface 340, a display 350, and one or more forms of input/output (I/O) 360 that all operatively interconnected by a system bus 335. Memory 305, processors 320, storage device 325, and network interface 340 illustratively perform similar functions as described above in relation to server 200.

The display 350 may illustratively comprise a conventional liquid crystal display (LCD) or light emitting diode (LED) computer monitor or other visual display as are known to those skilled in the art. The I/O system 360 may comprise, for example, a keyboard, mouse, light pen, touchscreen and/or other forms of inputting data and manipulating GUI elements in accordance with various embodiments of the present invention. In one illustrative embodiment, the I/O may comprise a keyboard and mouse that may be utilized to enter data and to rearrange a plurality of GUI windows.

A web browser 315 enables a user of the client computer system 300 to access a webpage provided by application 215. Illustratively, the web browser 315 accesses a webpage provided by application 215 via web server (not shown) executing on server 200. In alternative embodiments, a local version of the application 370 may be stored in memory 305 and executed by processor 320.

Memory also includes a report renderer module 350 that will render a report data structure 500 for display on a screen or to be printed on a printer (not shown). Illustratively, the report renderer 350 is shown as a separate module. However, in accordance with alternative embodiments of the present invention, the report renderer 350 may be integrated into the web browser 315, application, and/or operating system 310. Therefore, the description of report renderer 350 being a separate module should be taken as exemplary only. In operation, the report renderer 250 examines the report data structure 500 and renders the report contained therein in a manner suitable for display on the I/O devices associated with system 300.

FIG. 4 is a schematic block diagram of an exemplary mobile device 400 in accordance with an illustrative embodiment of the present invention. As noted above, mobile device 400 may comprise any device capable of executing applications and/or accessing the World Wide Web. Illustratively, mobile device 400 may comprise a smart phone, a personal digital assistant (PDA), and/or a tablet computer. The mobile device 400 illustratively comprises network interfaces 440, one or more processors 420, a memory 405, a storage device 425, and a cellular network card 445 interconnected by a system bus 435.

Memory 405, processor 420, storage device, I/O 460, and network interface 440 function similarly to those components described above. Display 450 may comprise a touchscreen that is used for both display and input purposes. Cellular network card 445 may implement the circuitry to enable the mobile device to access one or more cellular networks for, e.g., data transmission and reception.

Memory 405 illustratively stores an operating system 410, an application 370, a web browser 460, a report renderer module 480, and/or a report data structure 500. The operating system 410 functionally organizes the mobile device 400 and provides a mechanism for applications to execute thereon. The web browser 460 may be used to access the world wide web, including, in alternative embodiments, application executing on server. The application 370 may run locally on mobile device.

The report renderer module 480 may be integrated into operating system 410, application 370, and/or web browser 460 in accordance with alternative embodiments. The report renderer may also be implemented as a standalone software. Therefore, the description of report renderer 480 being a separate module should be taken as exemplary only.

II. Self-Contained Report Data Structure

Embodiments of the present invention are directed to the generation and rendering of reports using an exemplary report data structure. While the description contained herein is directed to financial reports, the principles of the present invention may be utilized in other fields. As will be appreciated, the use of the term transactions is directed to a financial report. More generally, a transaction should be viewed as an entry of the data utilized to generate the report. As will be appreciated by those skilled in the art, the time and effort required to produce financial reports is high, especially if they are bespoke to an individual company. The present invention enables the automated generation of high-value and customized financial reports that are specific to a business. Given that each business is different, the system is capable of adjusting the portions of a report to adapt to a given business. Portions of a report are included/excluded based on the usefulness as well as sorted based on usefulness.

The principles of the present invention enable a new type of reporting experience that differs from the prior art experiences. As will be appreciated by those skilled in the art, conventional report experiences are typically divided into either a completely static report or a real-time dashboard display. Both experiences have noted disadvantages. Static reports, such as a report stored in the well-known PDF format, are generated once and remain static and non-interactive. The real-time dashboard display experience may be computationally expensive depending on complexity, which may require processing to be done on a server and then displayed on an end user's device. This requires network connectivity in the client-server model, or for the end user's device to have sufficient processing power to render the report in a manner that does not invoke lag times in rendering information.

The present invention provides a new experience in that the substantially complex processing is performed at report generation time. The report is then stored in a platform independent format that may be rendered by report renderers that do not require complex processing. Instead the report renderers simply render the report sections, and associated components, in the specified order from the report data structure. As all the data to be displayed is contained within the report data structure, rendering is substantially instantaneous. Further, as the data is available in the report data structure, components may include interactivity, such as displaying individual entries that have been aggregated for display.

In general, an exemplary report generator will capture a data set, e.g., all transaction data, for a given time period, and analyze it to identify items that may be of interest, especially when compared to, e.g., a predefined comparison time period. The report generator will also identify ideal components for display of the data that may be ranked to determine the best display. Examples of decisions that may be automated include, e.g., if company spending in a time period is split between a few large categories and a plurality of smaller ones, a pie chart may be ideal, assuming that there are no negative numbers. However, if there is a negative number, e.g., representative of a refund, then a waterfall graph may be ideal.

The report is illustratively stored in an exemplary hierarchical data structure that includes top level information and then one or more sections, each of which includes one or more components. As used herein a section is defined as a set of components. Various sections may have a list of predefined eligible components that may be included depending on the data set. A component is generally defined as a collection of data and metadata that is needed to render the data. Exemplary components include various types of charts, graphs, tables, etc. In an illustrative embodiment, the report generator and report renderer maintain a master list of component types that may be utilized in various reports.

When a report type is created, one or more section types may be associated with the report type.

Figure 5A:
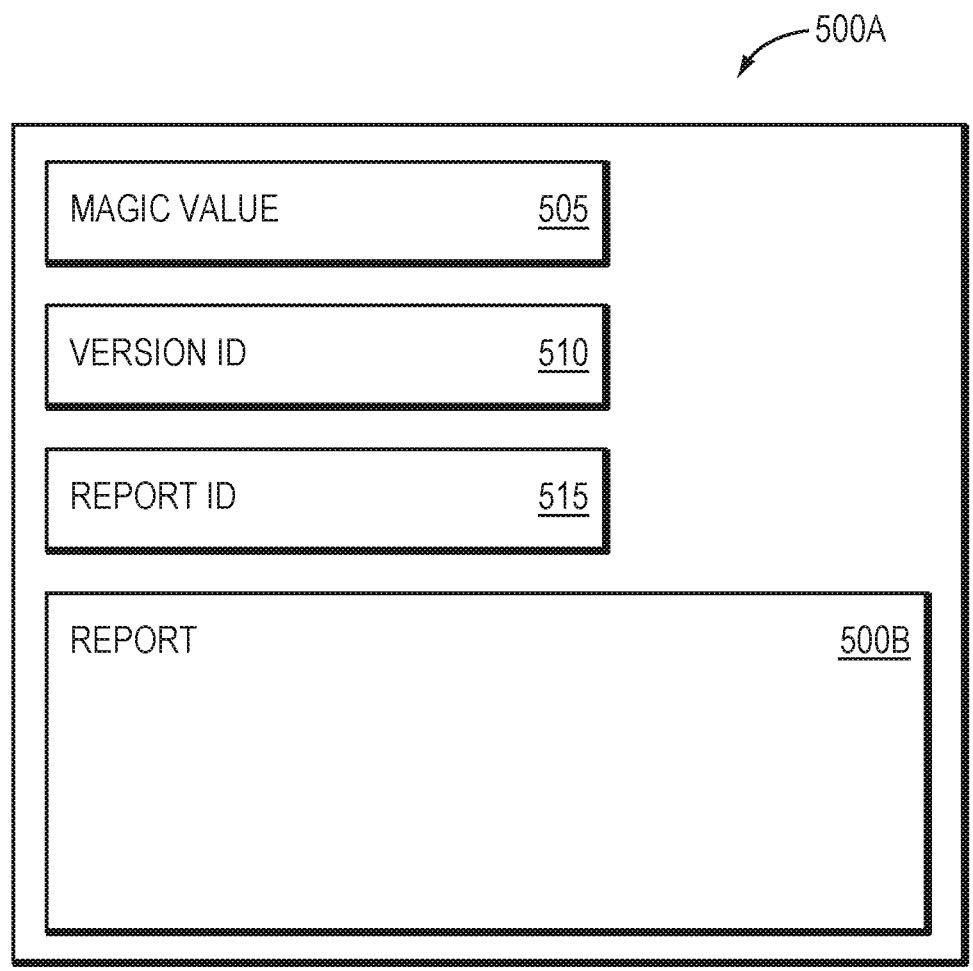
FIG. 5A is an exemplary data structure of a report wrapper data structure in accordance with an illustrative embodiment of the present invention.

A report 500 is illustratively comprised of a report wrapper data structure 500A that encapsulates a report data structure 500B. FIG. 5A is an exemplary report wrapper data structure 500A in accordance with an illustrative embodiment of the present invention. Illustratively, the report wrapper data structure 500A includes a magic value field 505, a version identifier field 510, a report identifier field 515, and a report data structure 500B. The magic value field 505 illustratively contains a magic value that identifies this data structure as a report. This may comprise, e.g., a predefined bit pattern identifying the data structure as a report.

The version ID field 510 identifies which version of the report data structure is utilized for this report. As new features are added to the report data structure, the version ID may be changed so that a report renderer can identify if it is capable of supporting all of the features included in the report. A report renderer may also utilize the version ID to determine how to interpret the report data structure 500B as changes to that layout may occur between versions. For example, a new component may be added to the universe of components that can be rendered within a report in Version X. If a report renderer is capable of supporting up to Version Y, and Y<X, the report renderer may not be able to render all of the components within the report. In such cases, the report renderer may present an error message, cause an automated update to occur, etc. as will be appreciated by those skilled in the art.

The report ID field 515 is utilized to provide an identifier of the report contained within the report data structure 500B. Illustratively, the report generator provides the report ID when the report is generated.

It should be noted that while the report wrapper data structure 500A is shown having particular fields and arrangement, in alternative embodiments of the present invention, the report wrapper data structure 500A may comprise a differing layout. As such, the description contained herein should be taken as exemplary only.

Figure 5B:
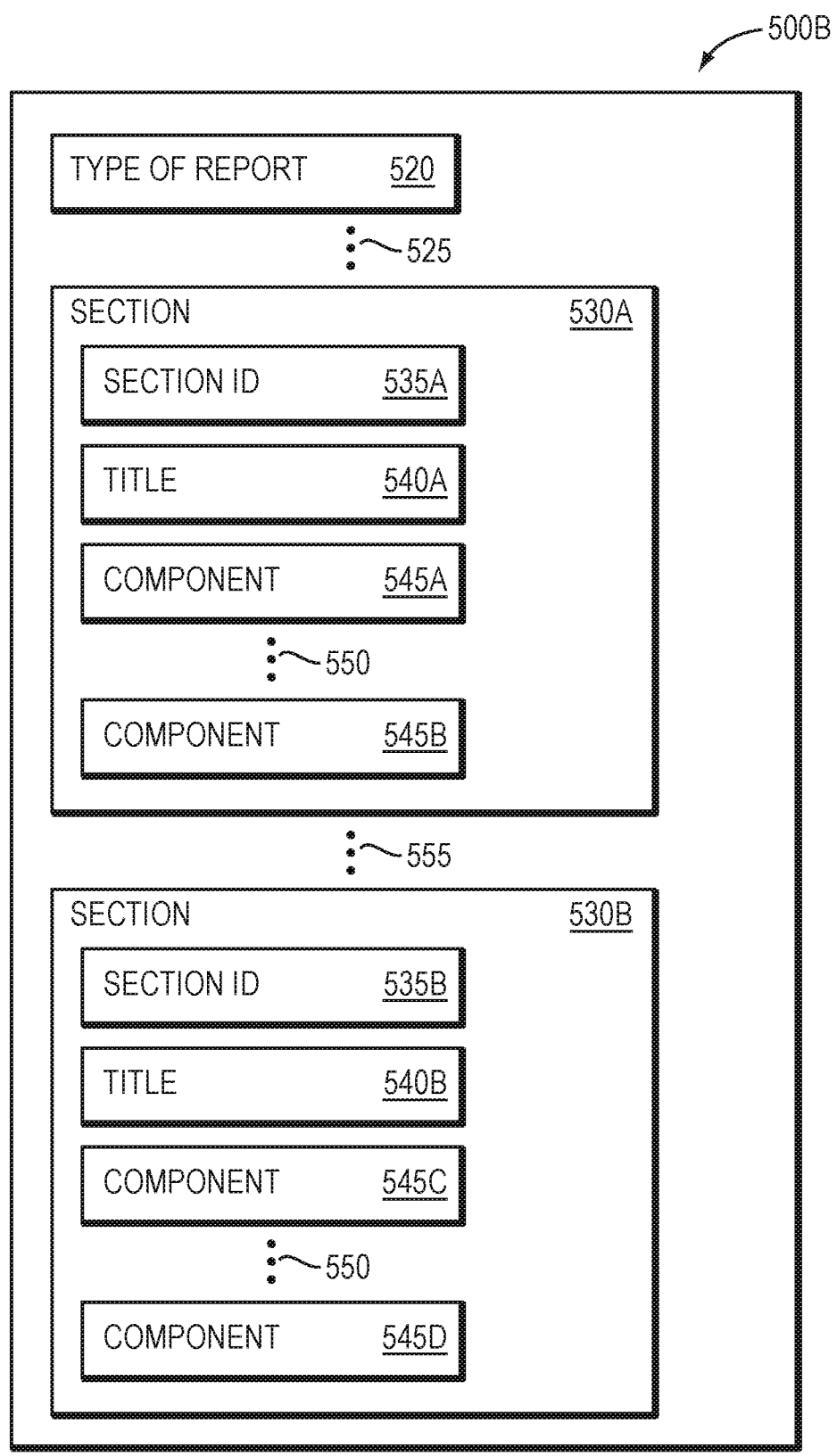
FIG. 5B is an exemplary report data structure in accordance with an illustrative embodiment of the present invention.

FIG. 5B is an exemplary report data structure 500B in accordance with an illustrative embodiment of the present invention. The report data structure illustratively comprises of a type field 520 and one or more section fields 530A,B. Additional fields 525 may be included before the first section field 530A. Illustratively, the type field 520 identifies a type of report contained herein. This type may be used by the report renderer to make choices as how to render certain components. For example, if the report type is a financial report, negative numbers may be displayed in parentheses, e.g., ($1,050.45), as is common with financial reports.

Each section field 530 includes a set of entries including, for example, a section identifier field 535, a title field 540, and one or more component fields 545. The section identifier field 535 identifies what type of section is associated with the field. In accordance with illustrative embodiments of the present invention, a report generator/renderer may include a plurality of predefined section types, e.g., a Balance Sheet, a Profit and Loss, a Spending Analysis, etc. in the case of a financial report.

A title field 540 includes an exemplary text string that may be used as the title of the section when it is rendered. In accordance with illustrative embodiments of the present invention, certain sections may utilize predefined titles; however, in alternative embodiments, a user may modify the title at the time of report generation.

The component fields 545 identify components that are associated with the section. The components may be selected from a list of predefined components supported by the report generator/renderer. Exemplary components may be differing types of graphs, e.g., line, bar, etc., types of charts, e.g., pie, etc. As will be appreciated by those skilled in the art, the components that may be utilized may vary depending on a type of report and the field in which the report is generated.

In accordance with an illustrative embodiment of the present invention, one section may comprise a component that lists all transactions included in the report. In accordance with alternative embodiments of the present invention, this section may or may not be rendered when the report is displayed. However, by including it within the report data structure, the transaction data is available for use. One exemplary use would be to enable a report renderer to display individual transactions if, for example, a user clicked on a slice of a pie chart. That is, if a user clicked on a slice of a pie chart of a report rendered in a web browser, the report renderer could display all the transactions that are associated with that slice. By including the list of transactions, a report renderer may provide a more interactive experience with a report as compared to conventional static report displays.

Illustratively, certain components may be interactive components that comprise additional data, e.g., underlying transaction or other entry data, that may not be initially rendered. In the example of a pie chart, the individual transactions/entries may not be displayed, but only various categories. However, if a user selects a part of the component in the report renderer, the renderer may further render the component to display the additional data, e.g., a list of transactions that had been aggregated into a slice of a pie chart.

While an exemplary data structure 500 A, B is shown and described to store a report, it should be noted that in accordance with alternative embodiments of the present invention, differing data structures may be utilized. In one exemplary embodiment, the report data structure and wrapper are implemented in Protocol Buffers or other techniques for serializing structured data. An exemplary definition is shown below:

```
ReportDefinition {
   string report_id
   string version_id
   ReportKind kind
   repeated Section sections
   enum ReportKind {
      WeeklyExpensesReport
      MonthlyExpensesReport
      CashflowReport
      ProfitLossReport
      <etc>
   }
}
Section {
   string section_id
   string title
   repeated Component components
}
Component {
   string component_id
   string title
   oneof Kind {
      NestedComponent      nested_component
      TransactionList      transactions_list
      VendorList           vendors_list
      SummariesByVendors   vendors_bar_chart
      SummariesByVendors   vendors_scatter_plot
      <etc, all supported   components>
   }
}
```

-continued

```
// Special Component type to encapsulate other components,
// for example, to group 2 vendor components (chart & list)
and present them in the same row.
NestedComponent {
   repeated Component components
}
```

By creating a hierarchical structure that contains the underlying data, a report renderer may render the report and enable the report to be interactive, depending on the limitations of the renderer. Specifically, and because the report 500 is a hierarchical data structure that is platform independent, the report 500 may be utilized by report renderers of different types of electronic device (i.e., different platforms) to display information associated with the report 500 that may be modified/adjustment such that the same information can be displayed differently on different electronic devices have different display characteristics.

In addition, only a single report 500 (e.g., a hierarchical data structure), according to the one or more embodiments described herein, needs to be generated and stored such that information associated with the report can be rendered and display on a plurality of different types of devices that may, for example, include different display characteristics. That is, a different report for each different type of electronic device that may have different display characteristics need not be generated and stored according to the one or more embodiments described herein. Accordingly, the one or more embodiments described herein provide an improvement to the computer itself by preserving storage resources of the computer (e.g., preserving storage resources of server 200 that includes report generator 250 that generates report 500).

III. Exemplary Rendered Report

FIGS. 6A-6D are exemplary images of pages of a report generated and rendered in accordance with illustrative embodiments of the present invention. It should be noted that the particular layout and structure of report pages should be taken as exemplary only and are designed to show a general layout of sections and components in accordance with an illustrative embodiment of the present invention. The exemplary report displayed in FIGS. 6A-6D is a weekly spending report for a business. In accordance with alternative embodiments of the present invention, differing reports will have differing sections and/or components. Therefore, the report illustrated in FIGS. 6A-6D should be taken as exemplary only.

Figure 6A:
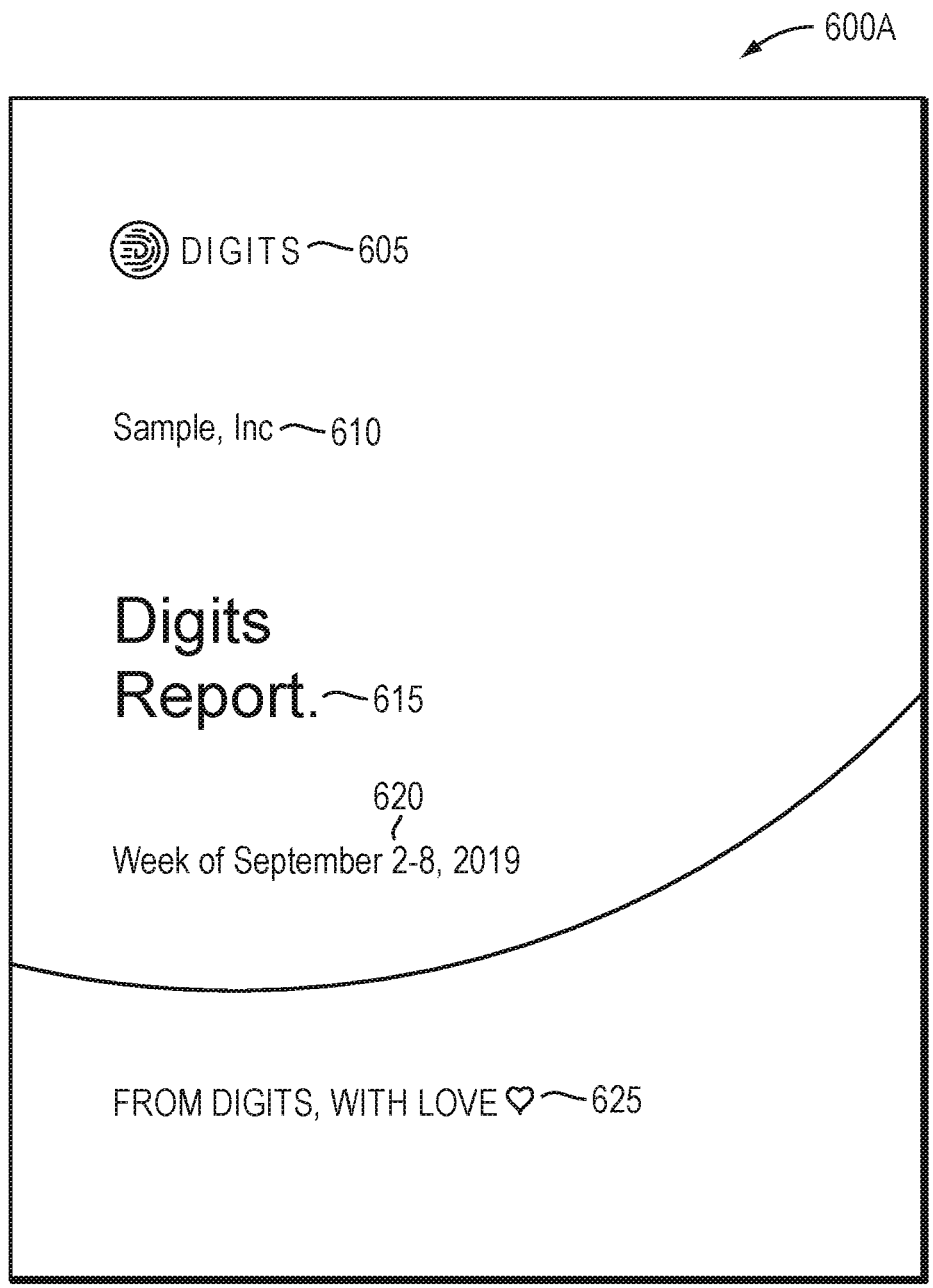
FIG. 6A is an image of a first page of an exemplary report in accordance with an illustrative embodiment of the present invention.

FIG. 6A is an image of a first page 600A of an exemplary report in accordance with an illustrative embodiment of the present invention. The first page 600A may be a title page that includes one or more objects including, e.g., a system logo 605, a company identifier 610, a report title 615, a time period 620, and/or optional text/and or graphics 625. The system logo 605 may be a predefined logo and/or text that identifies the software system that generated the report, such as application 215. This may be configurable within the software system. In alternative embodiments, no system logo 605 is displayed.

The company identifier 610 provides an illustrative text field that is used to identify the company, person, or other entity with which the report is associated. This may be the name of a corporate entity in the example of a financial report, with the name of a particular plant in the example of a monitoring/control report, etc. The report title identifies the report. The time period 620 identifies the time period associated with the report. This may be configurable by the report generator and based on the type of report being generated. For example, "Dec. 31, 2020", "Week of Sep. 2-8, 2019", "Jul. 3, 2020", etc. The format may vary depending on application needs.

The optional text field 625 may be used to display a logo, slogan, and/or other information, such as a distribution restriction, e.g., "CONFIDENTIAL—Accounting Department Only", etc.

Figure 6B:
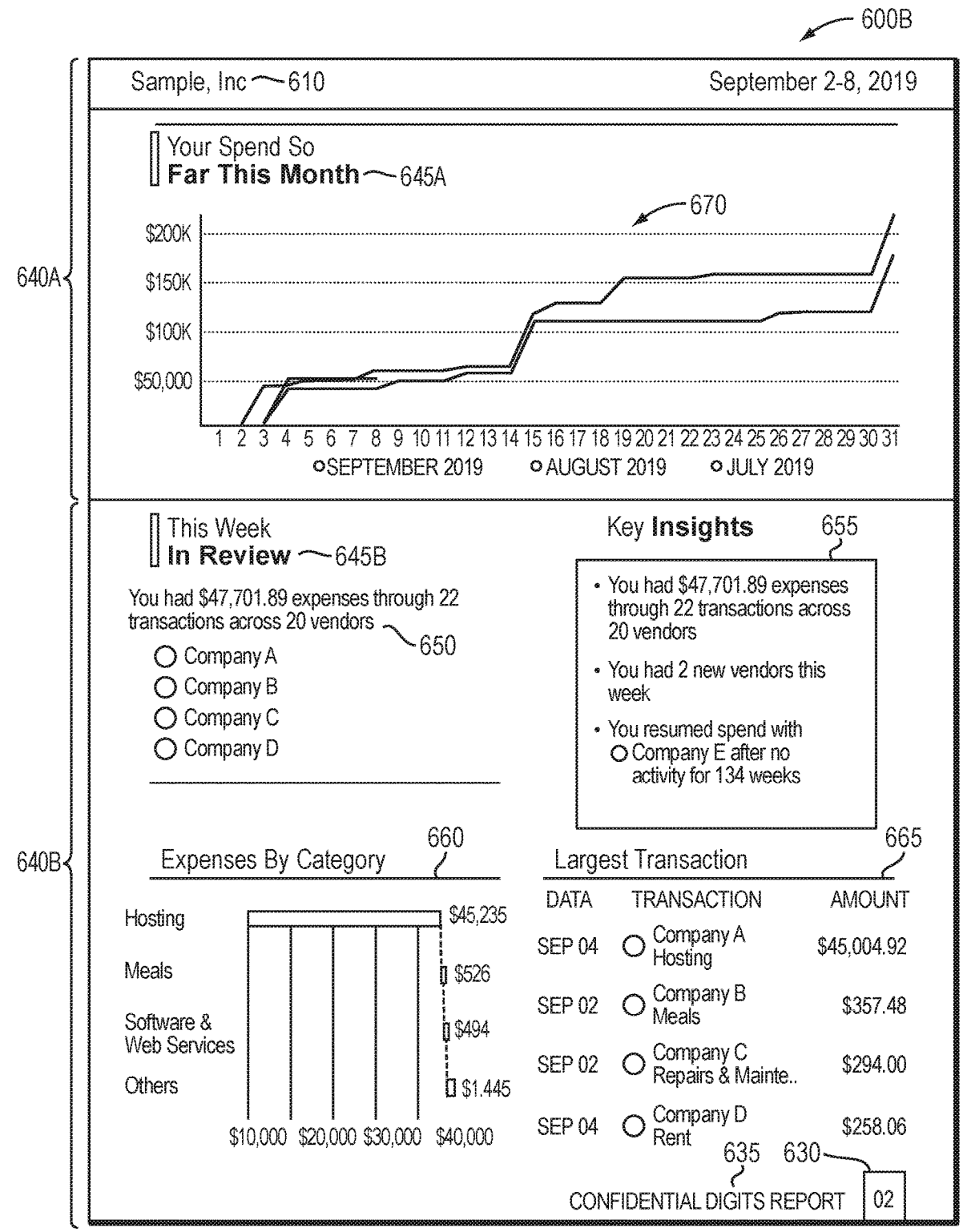
FIG. 6B is an image of a second page of an exemplary report in accordance with an illustrative embodiment of the present invention.

FIG. 6B is an image of a second page 600B of an exemplary report in accordance with an illustrative embodiment of the present inventions. The page 600B illustratively includes a header that comprises the company identifier 610 and time period 620. A footer illustratively comprises a page number 630 and customizable text 635.

Exemplary page 600B includes two sections 640A,B of the report. Exemplary section 640A includes a section title 645A and a single component 670. Exemplary section 640B also includes section title 645B as well as a number of components 650, 655, 660, 665. As can be seen, section 640A is a single component section, while section 640B is a multi-component section.

Figure 6C:
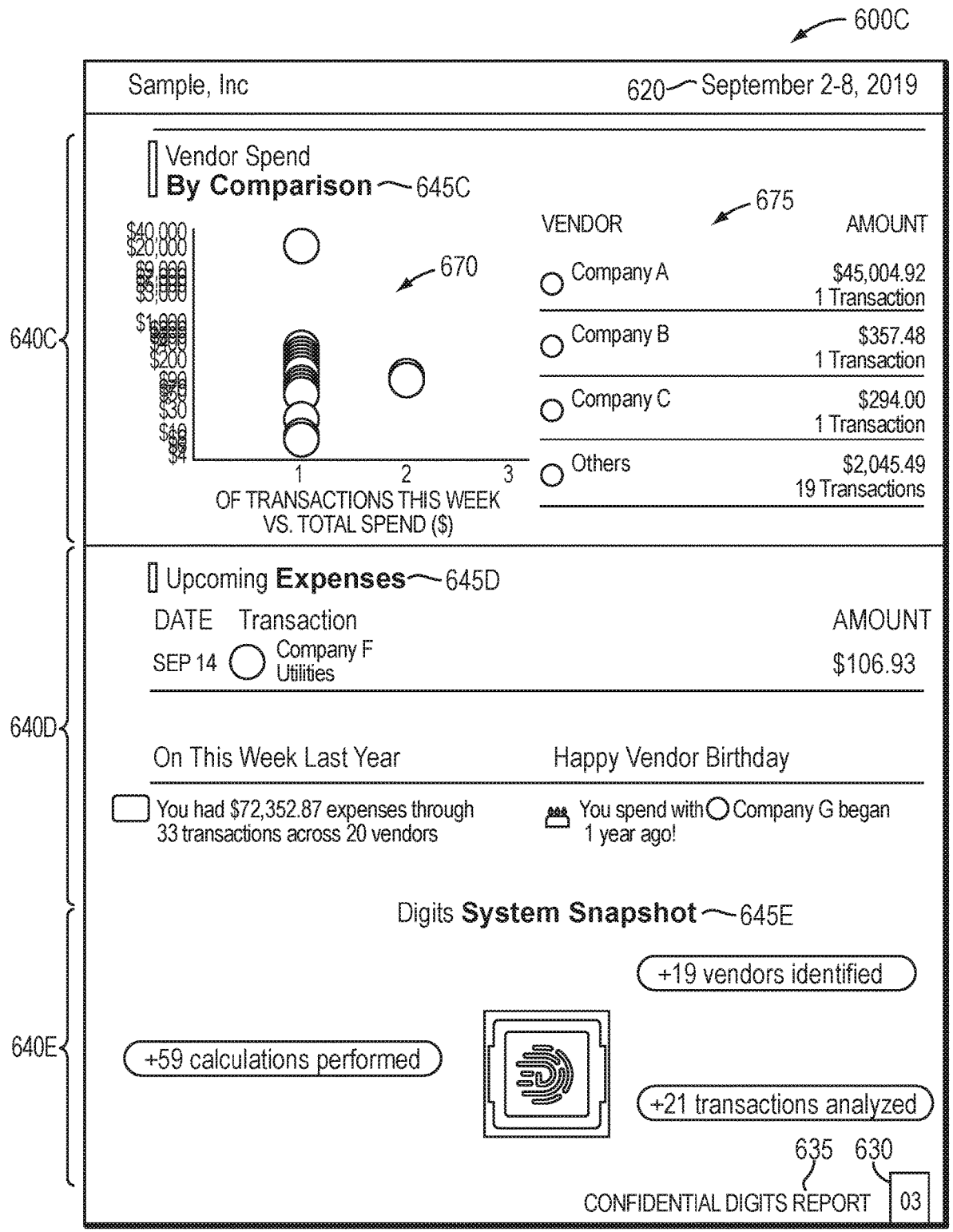
FIG. 6C is an image of a third page of an exemplary report in accordance with an illustrative embodiment of the present invention.

FIG. 6C is an image of a third page 600C of an exemplary report in accordance with an illustrative embodiment of the present invention. Like page 600B, this page includes a multi-component section 640C, as well as single component sections 640D,E.

FIG. 6D is an image of a fourth page 600D of an exemplary report in accordance with an illustrative embodiment of a present invention. Exemplary page 600D includes a single section 640F that is entitled 645F as "Transactions This Week." The various components 680A, B of the section are individual entries for each transaction that is included in the report.

IV. Exemplary Generation of a Self-Contained Report Data Structure

Figure 7:
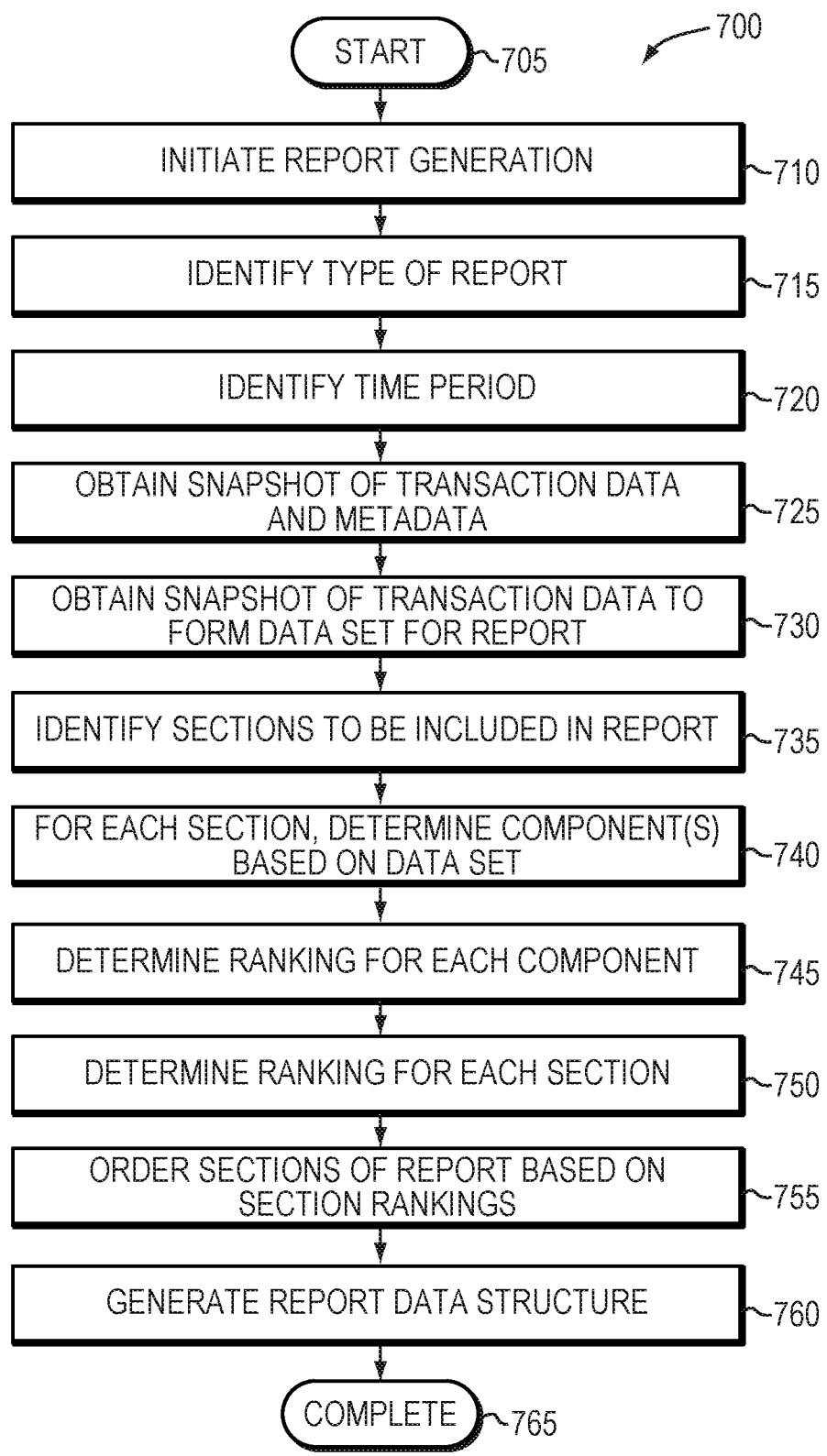
FIG. 7 is a flowchart detailing the steps of a procedure for automatically generating a report in accordance with an illustrative embodiment of the present invention.

FIG. 7 is a flowchart detailing the steps of an exemplary procedure 700 for automatically generating a report in accordance with an illustrative embodiment of the present invention. While the present disclosure is written in terms of preparing a financial report, it should be noted that the principles of the present invention may be utilized to generate non-financial reports. Therefore, the description of data entries as transactions and financial terminology should be taken as exemplary only. The procedure 700 begins in step 705 and continues to step 710 where the report generation is initiated. This may occur due to a predefined schedule, user activation, in response to an application detecting predefined criteria being met, etc.

In step 715, the report generator identifies the type of report to be generated. This detection may be the result of user action or as part of the predefined schedule. Illustratively, the type of report is used to determine the types of sections to be included in the report. For example, a weekly spending report may include those sections described above in relation to FIGS. 6A-D, while a revenue report will have differing sections contained therein. Then, in step 720, the time period to be covered by the report is identified. Like the determination of the type of report, this may occur due to the predefined schedule or by user action.

In step 725, the system obtains a snapshot of the transaction data and metadata. Illustratively, this occurs by the report generator obtaining a snapshot of the data, such as transaction data 245, and associated metadata associated with the type of report to be generated. From the snapshot acquired in step 725, a snapshot of the transaction data needed for the report is obtained in step 730 by generating a data set of the applicable data, e.g., transactions 245 that are application to the type of report and time period. While steps 725 and 730 are shown as two separate steps, in alternative embodiments, a single data collection may occur that identifies all data that is application to the type of report and time period. Therefore, the description of two steps should be taken as exemplary only. At the conclusion of step 730, the report generator has the complete set of data that is to be used in generating the report. That data may illustratively be included in a section of the report listing all transactions.

The report generator then identifies what sections are to be included in the report in step 735. This is illustratively based on the type of report as well as the transaction data. The system illustratively includes a set of predefined sections for types of reports. In the example report shown in FIGS. 6A-D for a weekly spending report, exemplary sections may be the amount spend so far in a month, the week in review, a comparison of vendor spend, upcoming expenses, etc. For other types of reports, differing sections may be utilized. Exemplary pseudocode for implementing step 735 is provided:

```
let sections = switch (report_type) {
  case "P&L REPORT":
    return array(INCOME_EXPENSE_CATEGORY_LIST)
  case "BALANCE SHEET REPORT":
    return array (ASSET_LIABILITY_CATEGORY_LIST)
  case "MONTHLY EXPENSE REPORT":
    return array( SPEND_OVERVIEW_GRAPH,
      TOP_CATEGORIES,
      TOP_VENDORS,
      NEW_VENDORS,
      ACTIVE_SUBSCRIPTIONS)
  ...
  <more report types>
  ...
  case "CUSTOM REPORT":
    return GET_USER_SPECIFIED_REPORT_SECTIONS ( )
}
```

As will be appreciated by those skilled in the art, a system may include a number of predefined types of reports. In alternative embodiments, a system may enable a user to generate and store a user specific, i.e., custom, report, that is encoded into the report generator/renderer's master list.

For each section to be included, the report generator identifies what component(s) should be included based on the data in the in the data set in step 740. This may be accomplished by analyzing the data to determine what component may be utilized to display the data. For example, if a category has a negative value, e.g., a refund, then a pie chart is not appropriate for displaying that data. Exemplary pseudocode for step 740 is shown below:

```
let components = switch (section) {
  case "TOP_CATEGORIES":
    return array( CATEGORY_PIE_CHART,
      CATEGORY_WATERFALL_GRAPH,
      CATEGORY_TABLE)
  case "ACTIVE_SUBSCRIPTIONS":
    return array( SUBSCRIPTIONS_OVER_TIME_BAR_CHART,
      SUBSCRIPTIONS_BY_CATEGORY_PIE_CHART,
      SUBSCRIPTIONS_BY_CATEGORY_TABLE,
```

```
    LARGEST_SUBSCRIPTIONS_TABLE,
    DUPLICATE_SUBSCRIPTIONS_TABLE)
    ...
    <more section types>
    ...
}
```

In step 745, each component is ranked. Exemplary pseudocode for ranking components is below:

```
const BAD = 50
const GOOD = 75
const GREAT = 100
let component_score = switch (component) {
    case "CATEGORY_PIE_CHART":
        // if one of the categories has a negative total
amount
            return BAD
        // if there are less than 10 categories
            return GREAT
        // otherwise (pie charts work, but are hard to
read with lots of slices)
            return GOOD
    case "LARGEST_SUBSCRIPTIONS_TABLE":
        // if largest subscription < 49.00 (i.e. all
subscriptions are pretty cheap)
            return BAD
        // if there are more than 10 active subscriptions
            return GREAT
        // otherwise (if there are very few active
subscriptions, we do not need a whole table dedicated to
just the big ones)
            return GOOD
    case "DUPLICATE_SUBSCRIPTIONS_TABLE":
        // if there are 1 or more duplicate subscriptions
(subscriptions with the same vendor)
            return GREAT
        // otherwise
            return BAD
    ...
    <more component types>
    ...
}
```

As can be appreciated from the exemplary pseudocode, each component illustratively includes a specific ranking decision tree that takes into account the positive and negative attributes of that component type as compared to the data to be included in the component.

In step 750, each section is then ranked. Illustratively, each section is assigned the rank of the highest component score contained therein. In alternative embodiments, a section may be ranked by combining the rankings of the components contained therein. However, in alternative embodiments, differing ranking systems may be utilized. Therefore, the description of a particular ranking system should be taken as exemplary only.

The report generator, in step 755, then orders the sections based on the rankings calculated for each section. In an illustrative embodiment, the sections or ordered from highest to lowest ranked. However, in accordance with alternative embodiments of the present invention, differing methods may be utilized. For example, a user may provide configuration so that a particular section is always displayed in a particular location, e.g., first. This ordering based on ranking serves to highlight items that are deemed important to a user of the report. This is a noted advantage over conventional static reports that display portions in the same order, regardless of whether information has changed that should be highlighted to a user.

Exemplary pseudocode for implanting step 755 is provided:

```
let report_sections = SORT(sections, using: (left, right) {
    // if left.score > right.score
        return left
    // else if right.score > left.score
        return right
    // otherwise (the scores are equal)
        // if left.preference >= right.preference
            return left
        // otherwise
            return right
```

The report data structure 500 is then generated in step 760. The data structure is generated to produce the report as ordered sections and components. The data structure may be saved in persistent storage or fed into a report renderer for display to a user. Exemplary pseudocode is provided:

```
const MINIMUM_SCORE_THRESHOLD = 70
let report_data = array( )
for each section in report_sections {
    for each component in section.components {
        if component.score > MINIMUM_SCORE_THRESHOLD {
            repor_data.append(component.data)
        }
    }
}
```

In an illustrative embodiment, any components that have a ranking above a predefined threshold are included in the report data structure. It should be noted that the predefined threshold may vary by, e.g., report type, section type, etc. Therefore, the description of a universal threshold value should be taken as exemplary only.

In an alternative embodiment of the present invention, the report data structure, which may be illustratively implemented as a serialized data structure, may be appended to a second data structure. This second data structure may comprise another, conventional, report type, such as a portable document format (PDF) file. In such alternative embodiments, a conventional report renderer, such as a PDF viewer, may render the report contained within the second data structure. If a report renderer is available that is compatible with the teachings of the present invention, then the more advanced report described herein may be rendered. It should be noted that while the term appended is used to describe the associating of the exemplary report data structure and the second data structure, in alternative embodiments, the reports may be associated in different ways, e.g., prepending, encapsulating in a larger data structure, etc. Therefore, the description of appending the two data structures should be viewed as illustrative only. The procedure ends in step 765.

V. Exemplary Rendering of a Self-Contained Report Data Structure

Figure 8:
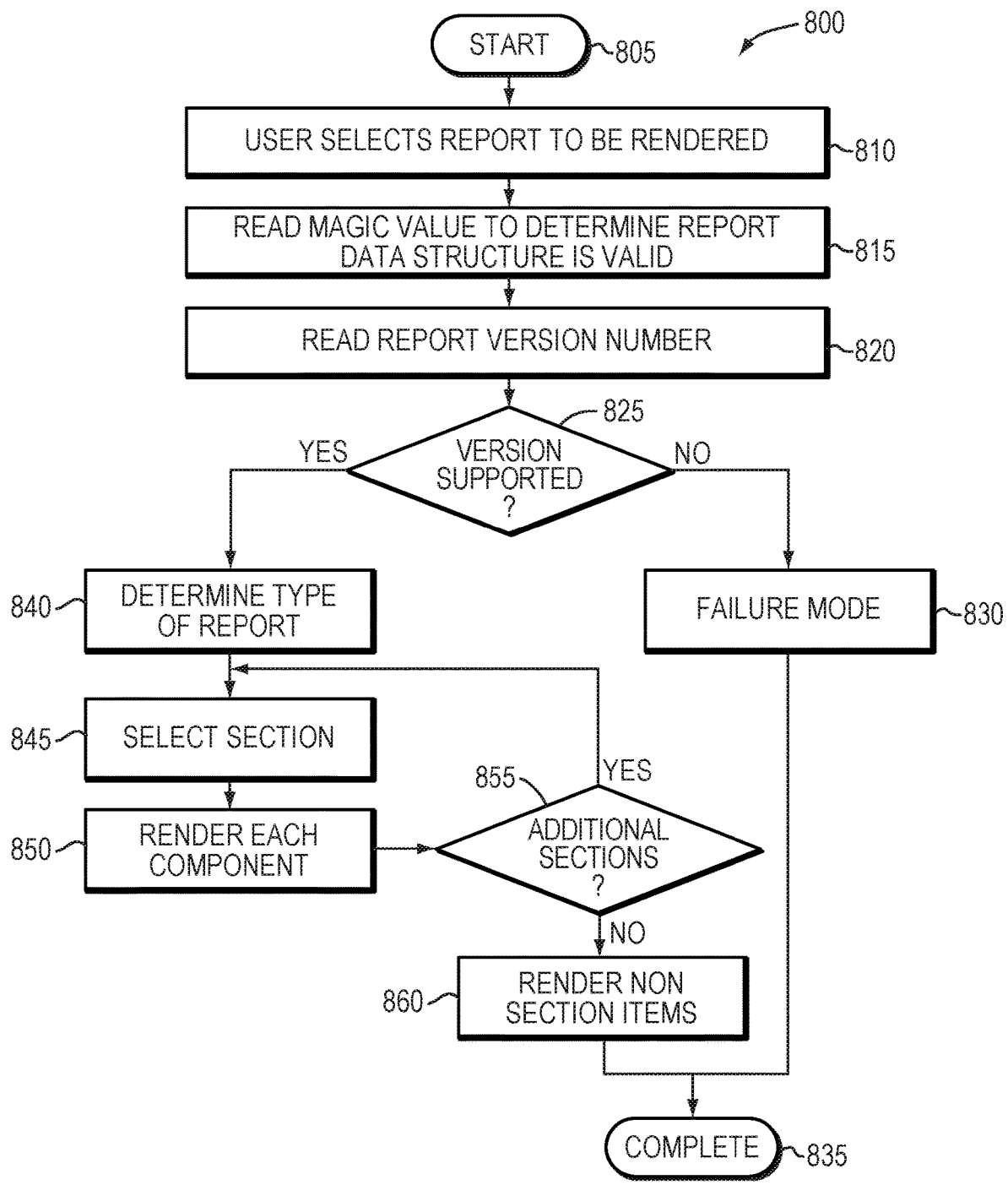
FIG. 8 is a flowchart detailing the steps of a procedure for rendering a report in accordance with an illustrative embodiment of the present invention.

FIG. 8 is a flowchart detailing the steps of a procedure 800 for rendering a report in accordance with an illustrative embodiment of the present invention. The procedure 800 begins in step 805 and continues to step 810 where a user selects the report to be rendered.

In step 815, the report renderer reads the magic value of the report data structure 500 to determine that the data structure is a report. By examining the magic value, the report renderer then knows that the data that is being read is a report, thereby allowing it to interpret the contents contained therein.

The report version number is then read in step 820 and a determination is made in step 825 whether the report renderer supports the indicated version. As the report data structure is updated, additional components or features may be added. The report renderer will need to be upgraded so that it is capable of understanding newer versions of the report data structure in order to interpret the report data structure to render the data contained therein.

If the version is not supported, the procedure branches to step 830 where a failure mode is entered. Various options exist for the failure mode. In one exemplary embodiment, the report renderer may present an option to download or otherwise install an updated version of the report renderer that is capable of supporting this version of the report data structure. In alternative embodiments, the report renderer may provide a link to another report renderer to render the report. For example, a report renderer integrated into an application may provide a link to a report renderer operating on a website that may be able to interpret the report data structure and render the report.

If the report version is supported, the procedure branches to step 840 where the type of report is identified. By identifying the type of report, the report renderer knows what types of sections may be included in the report.

The first section is selected in step 845 and each component of that section is rendered in step 850. This may be accomplished by, for example, reading the report data structure to identify the first section of the report as well as the associated components. The data for each component is obtained from the report data structure list for entries. Illustratively, the report renderer may adjust the display of the report based on the display characteristics of the device on which it is running. For example, two components may be displayed side by side when rendered on a desktop computer but displayed one after another when rendered on a smart phone or other mobile device with a limited screen size.

Because the report render may optimally modify/adjust the display of the components of the display based on the display characteristics of the electronic device such that different display modifications/adjustments may be performed for different electronic devices (e.g., desktop computers, laptop computers, mobile devices), the one or more embodiments described herein are necessarily rooted in computer technology. By storing the report in a platform independent data structure, a report renderer may display the report in a manner most suitable to the device on which it is running, e.g., desktop computer, tablet, smart phone, etc. As such, the one or more embodiments described herein provide an improvement in the existing field of electronic display across different types of devices.

After completing each component of the section, a determination is made in step 855 whether there are additional sections to be rendered. If so, the procedure branches to step 845 and selects the next section.

If there are no additional sections to be rendered, the procedure then continues to step 860 to render non-section items. These non-section items may include, e.g., items of an exemplary first page 600A of a report, such as a system logo, etc.

The procedure then completes in step 835. Once completed, the report has been rendered into the appropriate display format. As noted above, certain components may be interactive. For such interactive components, the report renderer may detect user actions such as hovering over a value or portion of a component, clicking on part of the component, highlighting part of a component, etc. In response, the report renderer may utilize the full set of data entries contained within the report data structure to show data in a differing granularity of format. One example would be if a user clicks on a slice of a pie chart, the report renderer may pop up a small window to display all of the individual entries that were aggregated into that slice.

Further, while this description has been written in terms of a financial software system, the principles of the present invention may be utilized with any form of software system that displays information in a graphical user interface. As such, the description of a financial system should be taken as exemplary only. While various components have been described as being implemented in hardware or software, it should be noted that it is expressly contemplated any of the functionality described herein may be implemented in hardware, software, firmware, or a combination thereof.

What is claimed is:

1. A computer implemented method comprising:
   identifying a type of report and a time period;
   obtaining a set of data related to entries that are associated with the type of report and the time period;
   based on the type of report, identifying one or more report sections to be populated;
   analyzing the set of data to determine one or more components to be included for each of the one or more report sections;
   ranking each of the one or more report sections;
   ordering the one or more report sections based on the ranking of each of the one or more report sections; and
   generating a serialized data structure that encapsulates the set of data, wherein the serialized data structure comprises a structured set of data configured to enable a report renderer to display, on a computer display screen, the one or more report sections each with the one or more components.

2. The computer implemented method of claim 1 wherein the one or more components are selected from a group consisting of a scatter plot, a line chart, a pie chart, a bar graph, and a table.

3. The computer implemented method of claim 1 wherein the serialized data structure is stored using protocol buffers (protobufs).

4. The computer implemented method of claim 1 wherein the set of data related to entries is stored within the serialized data structure.

5. The computer implemented method of claim 1 wherein ranking each of the one or more report sections further comprises ranking each of the one or more components included in each of the one or more report sections.

6. The computer implemented method of claim 5 wherein ranking each of the one or more components included in each of the one or more report sections comprises analyzing the set of data relating to the entries.

7. The computer implemented method of claim 1 wherein ranking each of the one or more report sections further comprises assigning a rank to each of the one or more report sections based on a highest ranked component in each of the one or more report sections.

8. A system comprising:
   an application executing on a processor of a device, the application including a report generator, the report generator configured to:
   identify a type of report and a time period;
   obtain a set of data related to entries that are associated with the type of report and the time period;

based on the type of report, identify one or more report sections to be populated;

analyze the set of data to determine one or more components to be included for each of the report sections;

rank each of the one or more report sections;

order the one or more report sections based on the rank of each of the one or more report section; and generate a serialized data structure that encapsulates the set of data, wherein the serialized data structure comprises a structured set of data configured to enable a report renderer to display, on a computer display screen, the one or more report sections each with the one or more components.

9. The system of claim 8 wherein the application is a financial application.

10. The system of claim 8 wherein the device is a server.

11. The system of claim 8 wherein the device is a mobile device.

12. The system of claim 8 wherein the one or more components are selected from a group consisting of a scatter plot, a line chart, a pie chart, a bar graph, and a table.

13. The system of claim 8 wherein the serialized data structure is stored using protocol buffers (protobufs).

14. The system of claim 8 wherein the set of data related to entries is stored within the serialized data structure.

15. The system of claim 8 wherein ranking each of the one or more report sections further comprises ranking each of the one or more components included in each of the one or more report sections.

16. The system of claim 15 wherein ranking each of the one or more components included in each of the one or more report sections further comprises analyzing the set of data relating to the entries.

17. The computer implemented method of claim 15 wherein a particular report section with one or more particular components is displayed on the computer display in a first configuration, of a plurality of different configurations, based on a type of the device.

18. The system of claim 8 wherein ranking each of the one or more report sections further comprises assigning a rank to each of the one or more report sections based on a highest ranked component in each of the one or more report section.

19. The system of claim 8 wherein a particular report section with one or more particular components is displayed on the computer display in a first configuration, of a plurality of different configurations, based on a type of the device.

20. A non-transitory computer readable medium having software encoded thereon, the software when executed by one or more computing devices operable to:

identify a type of report and a time period;

obtain a set of data related to entries that are associated with the type of report and the time period;

based on the type of report, identify one or more report sections to be populated;

analyze the set of data to determine one or more components to be included for each of the report sections;

rank each of the one or more report sections;

order the one or more report sections based on the rank of each of the one or more report section; and generate a serialized data structure that encapsulates the set of data, wherein the serialized data structure comprises a structured set of data configured to enable a report renderer to display, on a computer display screen, the one or more report sections each with the one or more components.

21. The non-transitory computer readable medium of claim 20 wherein the one or more components are selected from a group consisting of a scatter plot, a line chart, a pie chart, a bar graph, and a table.

22. The non-transitory computer readable medium of claim 20 wherein the serialized data structure is stored using protocol buffers (protobufs).

23. The non-transitory computer readable medium of claim 20 wherein the set of data related to entries is stored within the serialized data structure.

24. The non-transitory computer readable medium of claim 20, when ranking each of the one or more report sections, the software when executed by the one or more computing devices further operable to:

rank each of the one or more components included in each of the one or more report sections.

25. The non-transitory computer readable medium of claim 20, when ranking each of the one or more report sections, the software when executed by the one or more computing devices further operable to:

assign a rank to each of the one or more report sections based on a highest ranked component in each of the one or more report sections.

26. The non-transitory computer readable medium of claim 20, when ranking each of the one or more components included in each of the one or more report sections, the software when executed by the one or more computing devices further operable to:

analyzing the set of data relating to the entries.

* * * * *